US007620436B2

(12) United States Patent
Krenz et al.

(10) Patent No.: US 7,620,436 B2
(45) Date of Patent: Nov. 17, 2009

(54) PORTABLE COMMUNICATION DEVICE WITH GLOBAL POSITIONING SYSTEM ANTENNA

(75) Inventors: Eric L. Krenz, Crystal Lake, IL (US); Mohammed R. Abdul-Gaffoor, Palatine, IL (US)

(73) Assignee: Motorola, Inc., Schaumburg, IL (US)

( * ) Notice: Subject to any disclaimer, the term of this patent is extended or adjusted under 35 U.S.C. 154(b) by 571 days.

(21) Appl. No.: 11/024,063

(22) Filed: Dec. 28, 2004

(65) Prior Publication Data

US 2006/0142072 A1 Jun. 29, 2006

(51) Int. Cl.
*H04M 1/00* (2006.01)
(52) U.S. Cl. ............ 455/575.7; 455/575.5; 379/433.13; 343/348
(58) Field of Classification Search ................ 455/90.1, 455/90.2, 90.3, 556.1, 556.2, 578.5, 550.1, 455/575.1, 575.3–575.7; 379/433.01, 433.1, 379/433.13; 343/848, 702, 770, 700, 346, 343/348
See application file for complete search history.

(56) References Cited

U.S. PATENT DOCUMENTS

| 5,517,676 | A | 5/1996 | Sekine et al. | |
|---|---|---|---|---|
| 6,342,859 | B1 | 1/2002 | Kurz et al. | |
| 6,352,434 | B1 | 3/2002 | Emmert | |
| 6,839,577 | B2* | 1/2005 | Krenz et al. | 455/575.7 |
| 6,995,716 | B2* | 2/2006 | Hwang et al. | 343/702 |
| 7,269,393 | B2* | 9/2007 | Ota et al. | 455/90.3 |
| 2001/0008839 | A1 | 7/2001 | Cho | |
| 2002/0107055 | A1* | 8/2002 | Yamazaki et al. | 455/575 |
| 2002/0119801 | A1* | 8/2002 | Nemoto et al. | 455/550 |
| 2002/0177418 | A1* | 11/2002 | Kido | 455/90 |
| 2003/0030594 | A1* | 2/2003 | Larry | 343/895 |
| 2003/0186726 | A1* | 10/2003 | Akita | 455/562.1 |
| 2005/0143148 | A1* | 6/2005 | Sato et al. | 455/575.1 |
| 2006/0046787 | A1* | 3/2006 | Zhu et al. | 455/566 |

FOREIGN PATENT DOCUMENTS

EP 1 309 156 A1 5/2003

OTHER PUBLICATIONS

Pertti Vainikainen, Jani Ollikainen, Outi Kivekas, Ilkka Kelander, "Resonator-Based Analysis of the Combination of Mobile Handset Antenna and Chassis", IEEE Transactions on Antennas and Propagation, vol. 50, No. 10, Oct. 2002, 12 pages.

* cited by examiner

*Primary Examiner*—Nhan T Le
(74) *Attorney, Agent, or Firm*—Sylvia Chen; Daniel R. Collopy

(57) ABSTRACT

A portable communication device (100) has an antenna with predominantly upward antenna radiation patterns at GPS frequencies. The portable communication device (100) includes a housing with a base portion (240) enclosing base portion circuitry (241) and an upper clamshell portion (242) enclosing upper clamshell portion circuitry (243). The portable communication device (100) also includes a hinge assembly (244) coupled to the base portion (240) and the upper clamshell portion (242) for rotatably coupling the upper clamshell portion (242) to the base portion (240) and an antenna element (236) physically coupled to a first side (248) of the upper clamshell portion (242) and electrically coupled to a ground of the upper clamshell portion circuitry (243). The ground of the upper clamshell portion circuitry (243) is electrically connected to a ground of the base portion circuitry (241) by one side of the hinge assembly (244) located closest to a second side (250) of the upper clamshell portion (242) opposite the first side (248).

18 Claims, 9 Drawing Sheets

PORTABLE COMMUNICATION DEVICE WITH GLOBAL POSITIONING SYSTEM ANTENNA

FIELD OF THE INVENTION

The present invention generally relates to portable communications devices having a clamshell form factor, and more particularly relates to antennas for portable clamshell communications devices having Global Positioning System (GPS) functionality.

BACKGROUND OF THE INVENTION

Portable communication devices, such as cellular phones come in several different form factors. One common form factor is a clamshell phone which has a base portion (sometimes called a lower clam portion) coupled to an upper clam portion by one or more hinges. Antennas for such communication devices can be a whip antenna or a stubby antenna and are typically located at the top of the base portion. While sufficient for normal communication needs, the whip antenna and the stubby antenna have patterns that point strongly downward at GPS frequencies when used on clam form factor phones. When Global Positioning System (GPS) functionality is included in such portable communication device, GPS communication is hampered by the strong downward antenna patterns.

Thus, what is needed is an antenna for GPS communications that has an antenna pattern pointing upward. Furthermore, other desirable features and characteristics of the present invention will become apparent from the subsequent detailed description of the invention and the appended claims, taken in conjunction with the accompanying drawings and this background of the invention.

BRIEF DESCRIPTION OF THE DRAWINGS

The present invention will hereinafter be described in conjunction with the following drawing figures, wherein like numerals denote like elements.

DETAILED DESCRIPTION

A portable communication device is provided with an antenna having predominantly upward antenna radiation patterns at GPS frequencies. The portable communication device includes a housing including a base portion enclosing base portion circuitry and an upper clamshell portion enclosing upper clamshell portion circuitry. The upper clamshell portion has a first side, a second side, a bottom and a top. The portable communication device also includes a hinge assembly coupled to the base portion and the upper clamshell portion for rotatably coupling the upper clamshell portion to the base portion and an antenna element physically coupled to the first side of the upper clamshell portion and electrically coupled to a ground of the upper clamshell portion circuitry. The ground of the upper clamshell portion circuitry is electrically connected to a ground of the base portion circuitry by one side of the hinge assembly, the one side of the hinge assembly being located closest to the second side of the upper clamshell portion.

The following detailed description is merely exemplary in nature and is not intended to limit the invention or the application and uses of the invention. Furthermore, there is no intention to be bound by any theory presented in the preceding background of the invention or the following detailed description.

Figure 1:
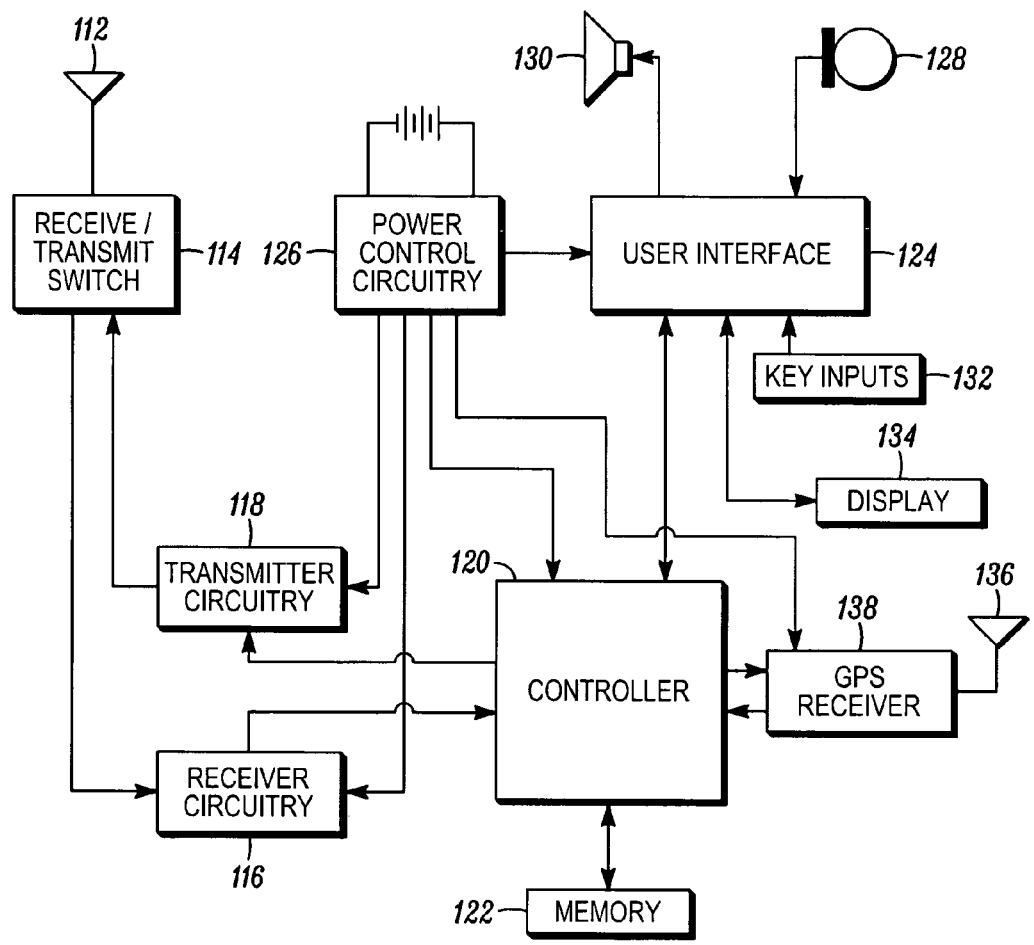
FIG. 1 is a block diagram of a portable communication device in accordance with a first embodiment.

FIG. 1 depicts a block diagram of a portable communication device 100, such as a cellular telephone, in accordance with a first embodiment. Although the portable communication device 100 is depicted as a cellular telephone, the portable communication device can be implemented as a pager, a laptop computer with a wireless connection, a personal digital assistant with wireless connection, a navigational device used to receive signals from satellites, or the like. The portable electronic device 100 includes a first antenna 112 for receiving and transmitting cellular radio frequency (RF) signals. A receive/transmit switch 114 selectively couples the first antenna 112 to receiver circuitry 116 and transmitter circuitry 118 in a manner familiar to those skilled in the art. The receiver circuitry 116 demodulates and decodes the RF signals to derive information and is coupled to a controller 120 for providing the decoded information thereto for utilization thereby in accordance with the function(s) of the portable communication device 100.

The controller 120 also provides information to the transmitter circuitry 118 for encoding and modulating information into RF signals for transmission from the antenna 112. As is well-known in the art, the controller 120 is typically coupled to a memory device 122 and a user interface 124 to perform the functions of the portable electronic device 100. Power control circuitry 126 is coupled to the components of the portable communication device 100, such as the controller 120, the receiver circuitry 116, the transmitter circuitry 118 and/or the user interface 124, to provide appropriate operational voltage and current to those components. The user interface 124 includes a microphone 128, a speaker 130 and one or more key inputs 132, including a keypad. The user interface 124 may also include a display 134 which could accept touch screen inputs.

In accordance with the first embodiment, the portable communication device also includes a second antenna element 136 coupled to a Global Positioning System (GPS) receiver 138 which operates under the control of the controller 120 and receives operational voltage and current from the power control circuitry 126. The GPS receiver 138 demodulates and decodes GPS signals received by the second antenna element 136. GPS signals typically have a frequency in the range of 1200 to 1600 MHz.

Figure 2:
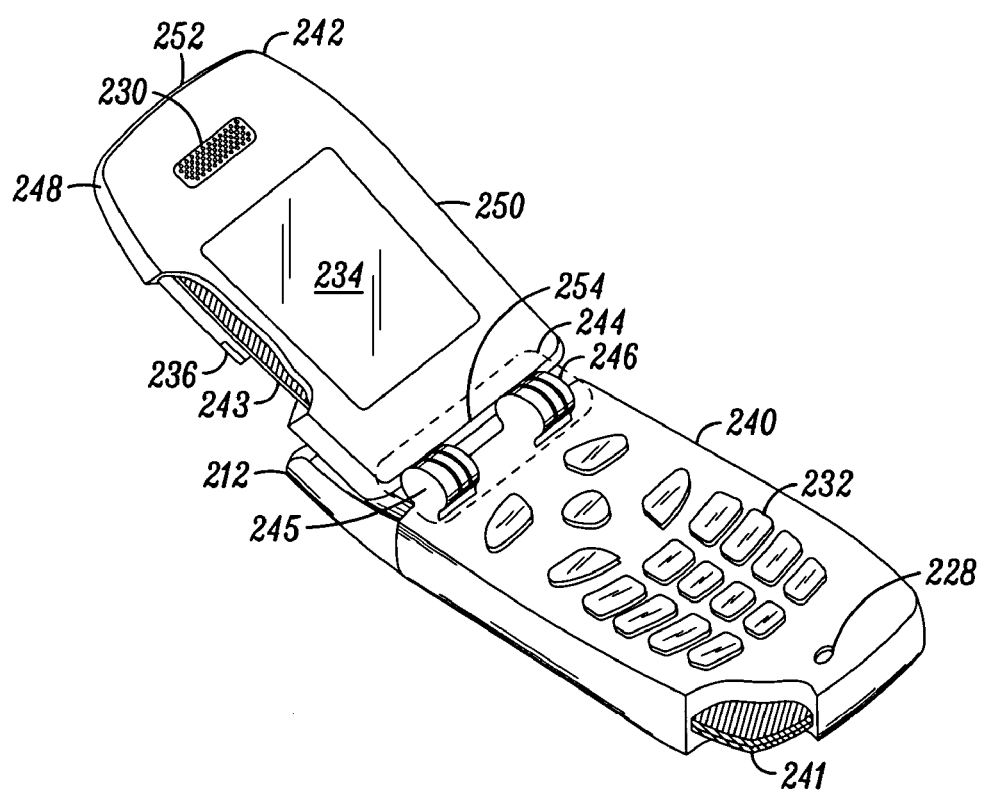
FIG. 2 is a diagram of portable communication device showing an antenna in accordance with the first embodiment.

FIG. 2 depicts the portable communication device 100 with a partial cut-away showing an antenna in accordance with the first embodiment. The portable communication device 100 includes a housing which has a base portion 240 for enclosing base portion circuitry 241 and an upper clamshell portion 242 for enclosing upper clamshell portion circuitry 243. The base portion 240 has the microphone 228 mounted therein and a plurality of keys 232 mounted thereon. The upper clamshell portion 242 has the speaker 230 and the display 234 mounted thereon. The first antenna element 212 is an external stubby antenna or whip antenna for transmitting and receiving cellular telephone signals and is mounted on the base portion 240. Alternately, the first antenna element can be an internal antenna. A hinge assembly 244 includes a plurality of hinges, such as hinge knuckles 245 and 246, and rotatably couples the base portion 240 of the housing to the upper clamshell portion 242.

In accordance with the first embodiment, the second antenna element 236, e.g., the GPS antenna, is a monopole antenna such as an inverted-F antenna and is physically coupled to a first side 248 of the upper clamshell portion 242 of the housing. The upper clamshell portion is further defined by a second side 250 opposite the first side 248, and a top 252 and a bottom 254. The upper clamshell portion circuitry 243 forms a first ground plane and the second antenna element 236 is electrically coupled to the first ground plane. Further, in accordance with the first embodiment, the first ground plane of the upper clamshell portion circuitry 243 is connected to a second ground plane formed by the base portion circuitry 241 through hinge knuckle 246, the hinge knuckle located closest to the second side 250 of the upper clamshell portion 242 along a side of the second ground plane orthogonal to the first and second sides 248, 250 of the upper clamshell portion 242. In other words, hinge knuckle 246 has a ground node formed therein which couples to the first ground plane and the second ground plane, i.e., the ground of the upper clamshell portion circuitry 243 and the ground of the base portion circuitry 241, respectively.

Hinge knuckle 245 closest to the second antenna element 236 is an open circuit, providing no electrical coupling between the upper clamshell portion circuitry 243 and the base portion circuitry 241. For this first embodiment, the second hinge 246 located away from the GPS antenna element 236, together with a ground electrical connection between the first and second ground planes, controls the radiation pattern to provide radiation patterns that point predominantly upward at GPS frequencies. In addition to the grounding of the upper clamshell circuitry 243 to the base portion circuitry 241, it is preferable that any other floating conductive portions of the base portion of the housing, such as a metallic battery door, are also connected to the ground of the base portion circuitry 241, near the hinge knuckle 246 closest to the second side.

Figure 3:
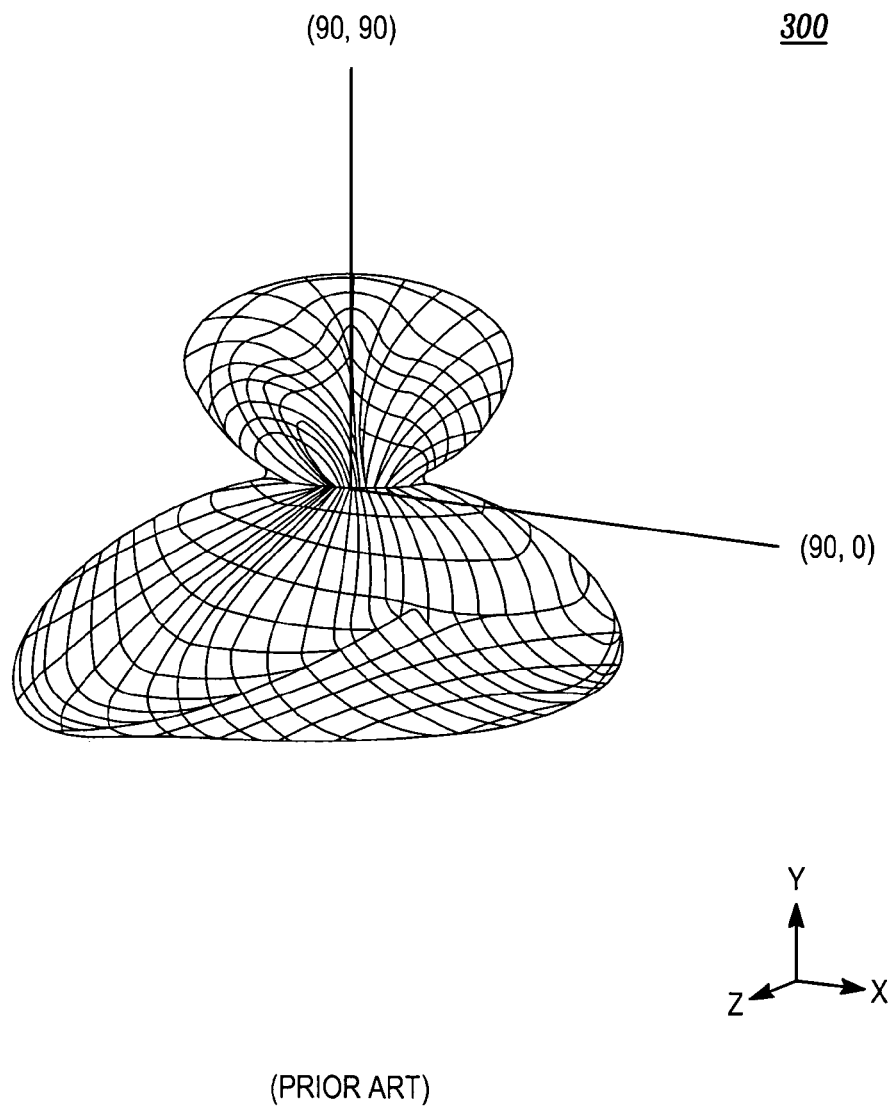
FIG. 3 is a simulation of a radiation pattern of a conventional stubby antenna.
Figure 4:
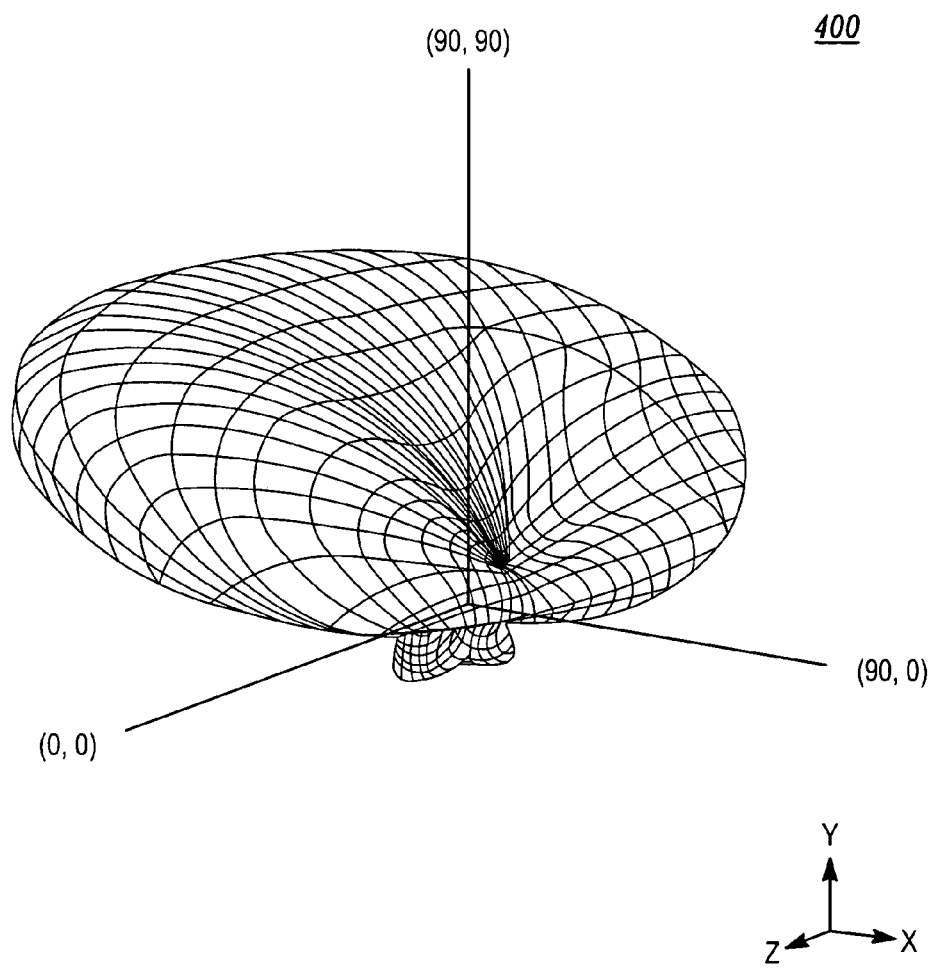
FIG. 4 is a simulation of the antenna radiation pattern in accordance with the first embodiment.

FIG. 3 is a simulation of a radiation pattern 300 of a conventional stubby antenna such as antenna element 212 shown in FIG. 2. As can be seen from the simulation, the radiation pattern is predominantly downward at GPS frequencies. FIG. 4 is a simulation 400 of a radiation pattern of an inverted F antenna such as antenna 236 shown in FIG. 2 where the grounds of the upper clamshell portion circuitry 243 and the base portion circuitry 241 are coupled through hinge knuckle 246 while hinge knuckle 245 is an open circuit. This radiation pattern shows a predominantly upward pattern at GPS frequencies.

Figure 5:
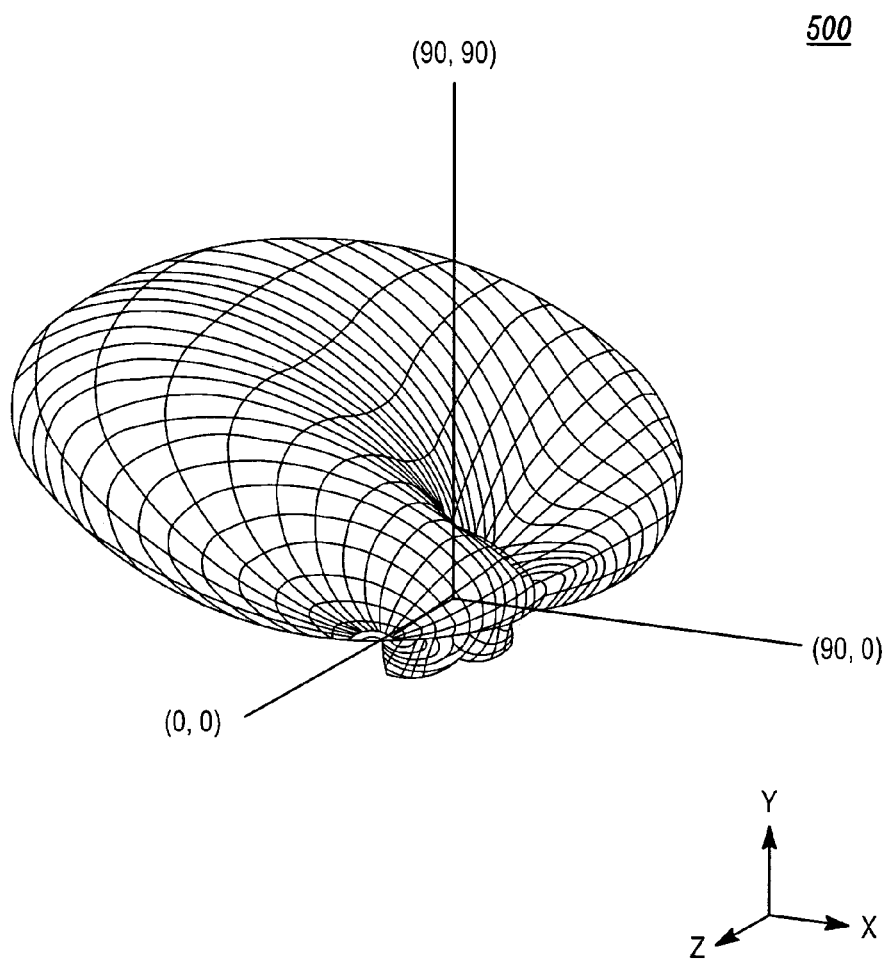
FIG. 5 is a second simulation of the antenna radiation pattern in accordance with the first embodiment.
Figure 6:
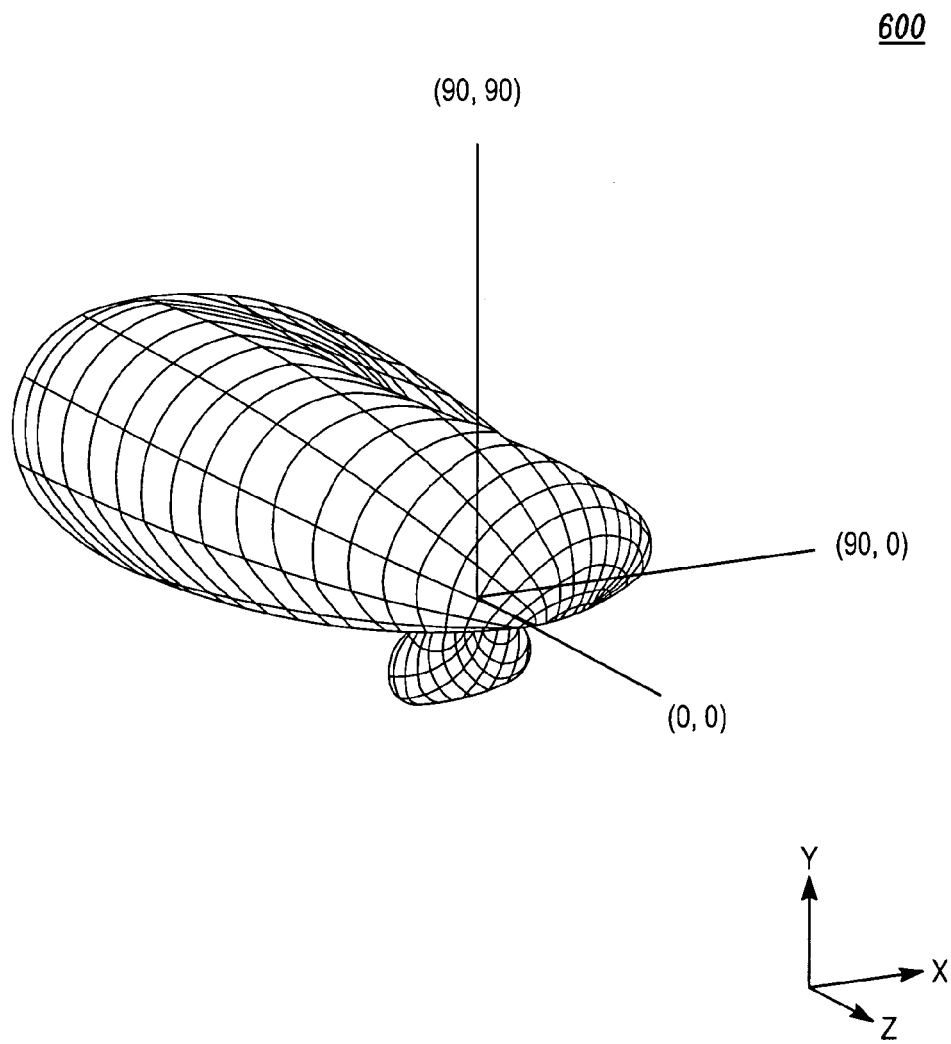
FIG. 6 is a third simulation of the antenna radiation pattern in accordance with the first embodiment.

Alternatively, the second hinge 246 can be located away from the GPS antenna element 236 at any arbitrary position or node along the hinge assembly 244, together with an appropriate reactive impedance or ground electrical connection between the first and second ground planes. The location of the second hinge 246 controls the radiation pattern to provide radiation patterns that point predominantly upward at GPS frequencies. Thus, the hinge knuckle 246 need not necessarily form a ground node (or a short circuit) between the first and second ground planes. Instead, the first and second ground planes could be coupled through the hinge knuckle 246 by an inductive or capacitive coupling reactance with a reactive impedance within the range of −j10 ohm reactive impedance to +j10 ohm reactive impedance. FIG. 5 is a simulation 500 of a radiation pattern of the antenna element 236 shown in FIG. 2 where the grounds of the upper clamshell portion circuitry 243 and the base portion circuitry 241 are coupled through hinge knuckle 246 by an inductive coupling with a reactive impedance of approximately +j10 ohm reactive impedance while hinge knuckle 245 is an open circuit. This radiation pattern shows a predominantly upward pattern at GPS frequencies. FIG. 6 is a simulation 600 of a radiation pattern of the antenna element 236 where the first and second ground planes are coupled through hinge knuckle 246 by a capacitive coupling with a reactive impedance of approximately −j10 ohm reactive impedance while hinge knuckle 245 is an open circuit. This radiation pattern also shows a predominantly upward pattern.

Figure 7:
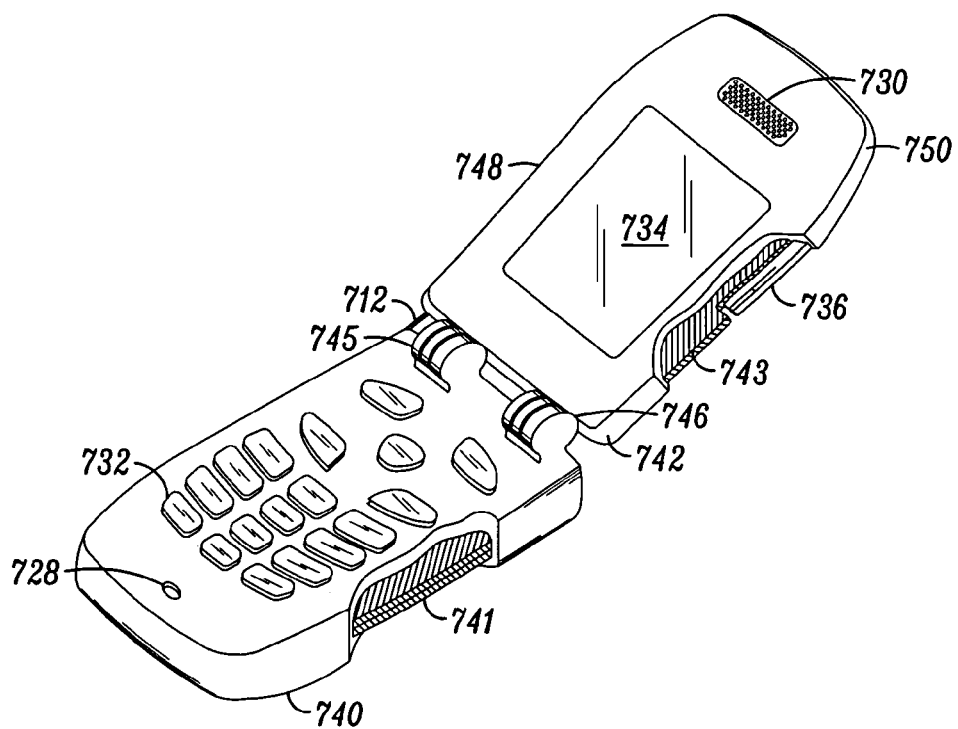
FIG. 7 is a diagram of portable communication device showing an antenna in accordance with a second embodiment.

A second embodiment of a portable communication device 700 is depicted in FIG. 7 where the GPS antenna element 736 is enclosed in the upper clamshell housing portion 742 on a second side 750 of the upper clamshell portion 742 of the housing and is grounded to upper clamshell circuitry 743 enclosed within the upper clamshell housing 742. The base portion 740 of the housing encloses base portion circuitry 741 which is grounded to the ground of the upper clamshell circuitry 743 through a first hinge knuckle 745, the hinge located closest to a first side 748 of the upper clamshell portion 742. The second hinge knuckle 746 is located closest to the second side 750 of the upper clamshell portion 742 and no electrical connection is made therethrough. Like the portable communication device 100 shown in FIG. 2, the portable communication device 700 includes other operational elements such as a speaker 730, display 634, external first antenna element 712, keys 732, and a microphone 728.

The embodiment shown in FIG. 7 demonstrates that the use of relational terms such as "first" and "second" are used solely for distinguishing one entity (in this instance, a "side") from another without necessarily requiring or implying any actual relationship or order between the entities.

Figure 8:
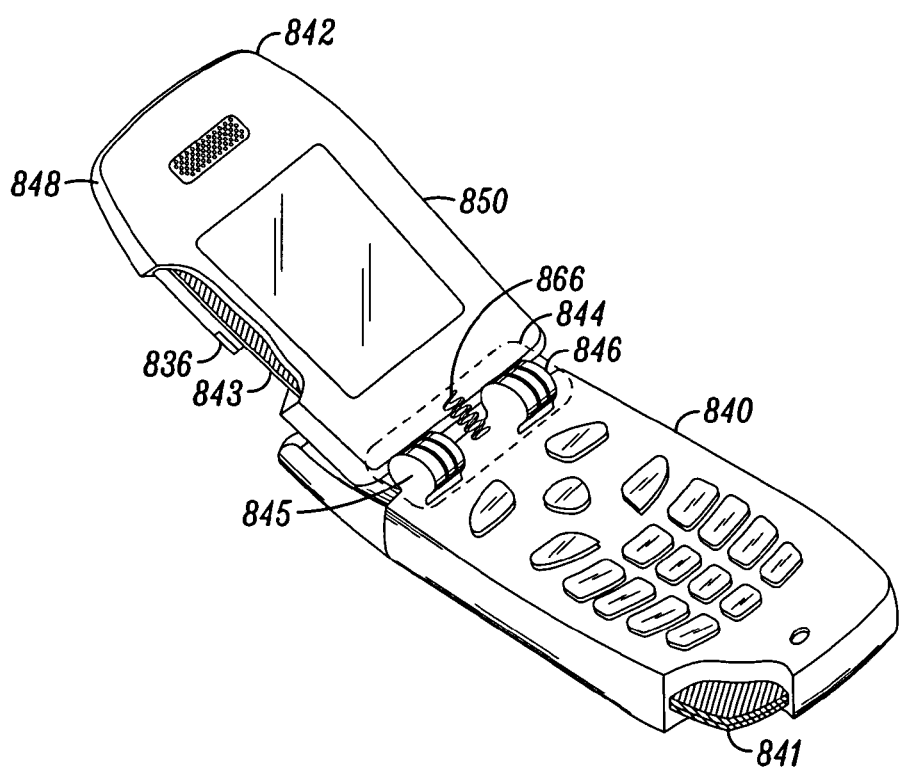
FIG. 8 is a diagram of portable communication device showing a hinge assembly in accordance with a third embodiment.
Figure 9:
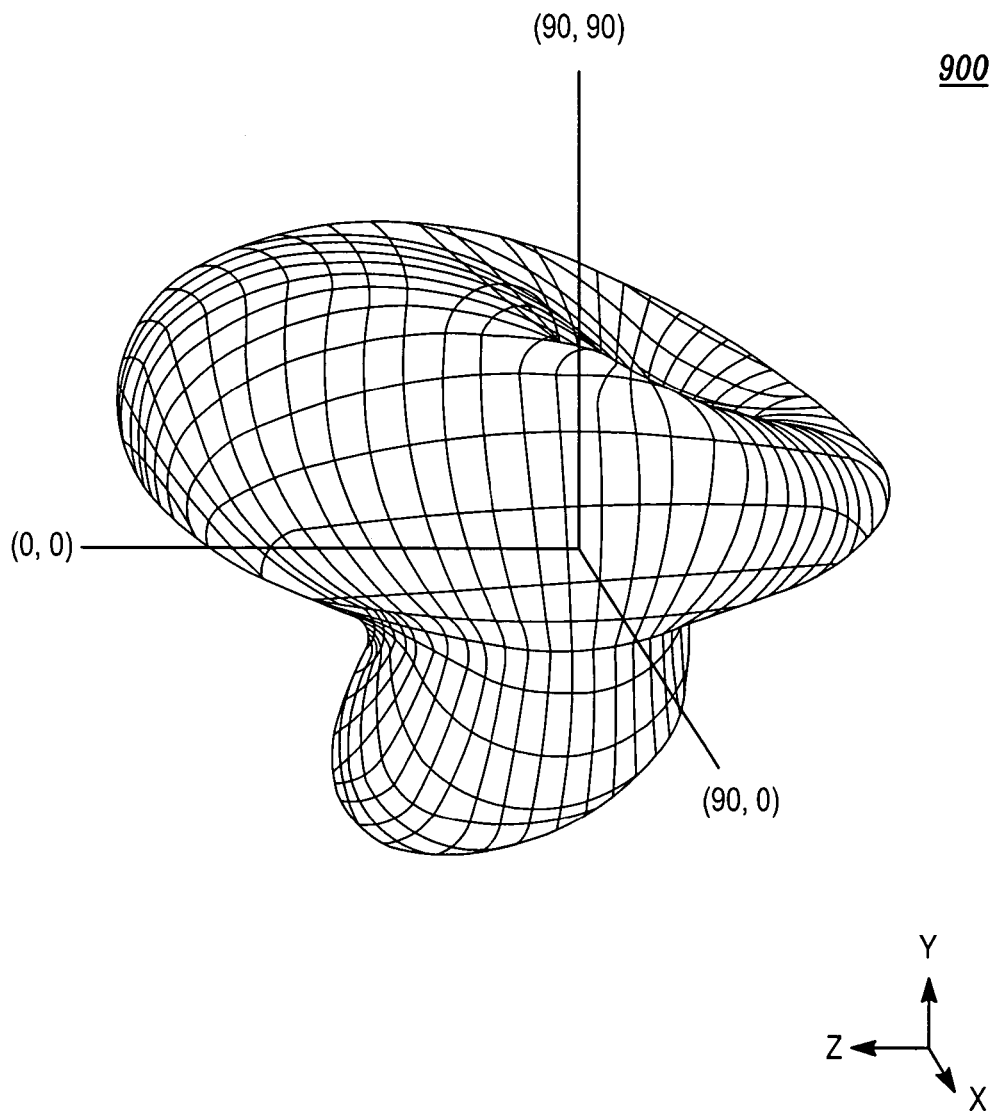
FIG. 9 is a simulation of the antenna radiation pattern in accordance with the third embodiment.

FIG. 8 depicts a third embodiment of a portable communication device 800 where the GPS antenna element 836 is enclosed in the upper clamshell housing portion 842 on a first side 848 of the upper clamshell portion 842 of the housing and is grounded to a first ground plane, the ground plane of upper clamshell circuitry 843 enclosed within the upper clamshell housing 842. The base portion 840 of the housing encloses base portion circuitry 841 which is grounded to a second ground plane. The upper clamshell portion 842 is coupled to the base portion 840 by hinge assembly 844 which includes hinge knuckle 845 and hinge knuckle 846. In this third embodiment, both hinge knuckles 845, 846 are left open (i.e., the first and second ground planes are not electrically coupled through either hinge knuckle 845, 846) and an electrical connection 866 is established at the middle of the upper clamshell portion 842 and the base portion 840 within the hinge assembly 844 in this embodiment, the electrical connection 866 between the first and second ground planes is an inductive reactive load of around +j45 ohm. FIG. 9 is a simulation 900 of a radiation pattern of the antenna element 836 where the first and second ground planes are coupled through an electrical connection 866 in a central portion of the hinge assembly 844 by an inductive coupling with a reactive impedance of approximately +j45 ohm reactive impedance while the hinge knuckles 845, 846 are each an open circuit. This radiation pattern also shows a predominantly upward pattern. A general extension of this third embodiment is to use just a single hinge connection located anywhere within the hinge assembly 844 but using an appropriate value of reactive impedance (rather than a perfect ground connection) to electrically couple the ground of the upper clamshell portion circuitry 843 and the ground of the base portion circuitry 841.

While at least three exemplary embodiments have been presented in the foregoing detailed description, it should be appreciated that a vast number of variations exist. It should also be appreciated that the exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims.

What is claimed is:

1. A portable communication device comprising:
   a first ground plane in a first housing;
   a Global Positioning System (GPS) antenna in the first housing positioned along a first side of the first ground plane and grounded thereto;
   a second ground plane in a second housing having a second side orthogonal to the first side; and
   a hinge assembly for physically coupling the first housing and the second housing, wherein the first ground plane is electrically coupled to the second ground plane through the hinge assembly at a node located along the second side of the second ground plane, the node having a reactive impedance predetermined to define an antenna radiation pattern for the GPS antenna pointing predominantly upward at the GPS frequencies for reception of the GPS signals.

2. The portable communication device of claim 1 wherein the antenna element is a monopole antenna element.

3. The portable communication device of claim 2 wherein the monopole antenna element is an inverted-F antenna element.

4. A portable communication device comprising:
   a first ground plane in a first housing;
   a Global Positioning System (GPS) antenna in the first housing positioned along a first side of the first ground plane and grounded thereto, the GPS antenna having an antenna radiation pattern pointing predominantly upward at GPS frequencies to receive GPS signals;
   a second ground plane in a second housing having a second side orthogonal to the first side; and
   a hinge assembly for physically coupling the first housing and the second housing, wherein the first ground plane is coupled to the second ground plane through the hinge assembly at a node located along the second side of the second ground plane, the node having a reactive impedance predetermined to define the antenna radiation pattern pointing predominantly upward at the GPS frequencies to receive the GPS signals, and wherein the hinge assembly comprises a first hinge knuckle located at a first end of the second side proximate to the first side and a second hinge knuckle located at a second end of the second side, the second end opposite to the first end, and wherein the node is located at the second hinge knuckle and has a reactive impedance between approximately −j10 ohms and +j10 ohms.

5. The portable communication device of claim 4 wherein the antenna element is a monopole antenna element.

6. The portable communication device of claim 5 wherein the monopole antenna element is an inverted-F antenna element.

7. A portable communication device comprising:
   a first ground plane in a first housing;
   a Global Positioning System (GPS) antenna in the first housing positioned along a first side of the first ground plane and grounded thereto, the GPS antenna having an antenna radiation pattern pointing predominantly upward at GPS frequencies to receive GPS signals;
   a second ground plane in a second housing having a second side orthogonal to the first side; and
   a hinge assembly for physically coupling the first housing and the second housing, wherein the first ground plane is coupled to the second ground plane through the hinge assembly at a node located along the second side of the second ground plane, the node having a reactive impedance predetermined to define the antenna radiation pattern pointing predominantly upward at the GPS frequencies to receive the GPS signals, the node located midway between a first hinge knuckle and a second hinge knuckle of the hinge assembly and having a reactive impedance of approximately +j45 ohms.

8. The portable communication device of claim 7 wherein the antenna element is a monopole antenna element.

9. The portable communication device of claim 8 wherein the monopole antenna element is an inverted-F antenna element.

10. A portable communication device comprising:
    a first ground plane in a first housing;
    an antenna element in the first housing positioned along a first side of the first ground plane and grounded thereto;
    a second ground plane in a second housing having a second side orthogonal to the first side;
    a hinge assembly for physically coupling the first housing and the second housing, wherein the first ground plane is coupled to the second ground plane through the hinge assembly at a node located along the second side of the second ground plane, the node having a reactive impedance predetermined to define an antenna radiation pattern for the antenna element pointing predominantly upward at Global Positioning System (GPS) frequencies; and
    a floating conductive element physically coupled to the second housing wherein the floating conductive element is electrically coupled to the second ground plane at the node.

11. The portable communication device of claim 10 wherein the antenna element is a monopole antenna element.

12. The portable communication device of claim 11 wherein the monopole antenna element is an inverted-F antenna element.

13. A portable communication device comprising:
    a first ground plane in a first housing;
    an antenna element in the first housing positioned along a first side of the first ground plane and grounded thereto;
    a second ground plane in a second housing having a second side orthogonal to the first side;
    a hinge assembly for physically coupling the first housing and the second housing, wherein the hinge assembly comprises a first hinge knuckle located at a first end of the second side proximate to the first side and a second hinge knuckle located at a second end of the second side, the second end opposite to the first end, wherein the first ground plane is coupled to the second ground plane through the hinge assembly at a node located along the second side of the second ground plane at the second hinge knuckle; and a floating conductive element physically coupled to the second housing wherein the floating conductive element is electrically coupled to the second ground plane at the node and the node has a reactive impedance between approximately −j10 ohms and +j10 ohms to define an antenna radiation pattern for the antenna element pointing predominantly upward at Global Positioning System (GPS) frequencies.

14. The portable communication device of claim 13 wherein the antenna element is a monopole antenna element.

15. The portable communication device of claim 14 wherein the monopole antenna element is an inverted-F antenna element.

16. A portable communication device comprising:

a first ground plane in a first housing;

an antenna element in the first housing positioned along a first side of the first ground plane and grounded thereto;

a second ground plane in a second housing having a second side orthogonal to the first side;

a hinge assembly for physically coupling the first housing and the second housing, wherein the first ground plane is coupled to the second ground plane through the hinge assembly at a node located along the second side of the second ground plane, and wherein the node is located midway between a first hinge knuckle and a second hinge knuckle of the hinge assembly; and a floating conductive element physically coupled to the second housing wherein the floating conductive element is electrically coupled to the second ground plane at the node and the node has a reactive impedance of approximately +j45 ohms to define an antenna radiation pattern for the antenna element pointing predominantly upward at Global Positioning System (GPS) frequencies.

17. The portable communication device of claim 16 wherein the antenna element is a monopole antenna element.

18. The portable communication device of claim 17 wherein the monopole antenna element is an inverted-F antenna element.

* * * * *